United States Patent [19]
Robillard et al.

[11] Patent Number: 5,382,790
[45] Date of Patent: Jan. 17, 1995

[54] ILLUMINATION DEVICE HAVING BEAM SPLITTING POLARIZATION MEANS

[75] Inventors: Christophe Robillard, Marly-le-Roi, France; Susan Ayari, Kehl-Goldscheuer, Germany; Eric Marcellin-Dibon, Strasbourg, France

[73] Assignee: Deutsche Thomson-Brandt GmbH, Villingen-Schwennigen, Germany

[21] Appl. No.: 35,397

[22] Filed: Mar. 23, 1993

[30] Foreign Application Priority Data

Jul. 24, 1990 [DE] Germany ............................ 4023452

[51] Int. Cl.$^6$ ............................................... G02F 1/00
[52] U.S. Cl. .................................... 250/216; 250/225; 359/48
[58] Field of Search ................. 250/225, 216; 359/48, 359/49, 50, 40, 63, 70; 353/20, 77, 122; 345/32, 87, 88; 358/60, 61

[56] References Cited

U.S. PATENT DOCUMENTS

| | | | |
|---|---|---|---|
| 1,887,650 | 11/1932 | Larner et al. | |
| 3,512,868 | 12/1967 | Gorikewicz et al. | 350/157 |
| 4,798,448 | 6/1989 | van Raalte | 350/345 |
| 4,913,529 | 4/1990 | Goldenberg et al. | 359/63 |

FOREIGN PATENT DOCUMENTS 1014836  12/1957  Germany .

OTHER PUBLICATIONS

Patent Abstracts of Japan vol. 12 No. 293 Aug. 10, 1988 63-67979.

*Primary Examiner*—David C. Nelms
*Assistant Examiner*—John R. Lee
*Attorney, Agent, or Firm*—Joseph S. Tripoli; Eric P. Herrmann; Dennis H. Irlbeck

[57] ABSTRACT

A device for illuminating an area includes a circular reflector for focussing a light ray from a light source into a beam. A polarizer splits the beam into an effective beam having a first polarization direction and a complimentary beam having a second polarization direction. The polarizer reflects the effective radiation toward the area to be illuminated and transmits the complementary radiation to a rough surface having a roughness at least an order of magnitude greater than the wavelength of the light to diffuse the light and reflect at least a portion of the complementary beam back to the reflector and another portion to the area to be illuminated.

7 Claims, 5 Drawing Sheets

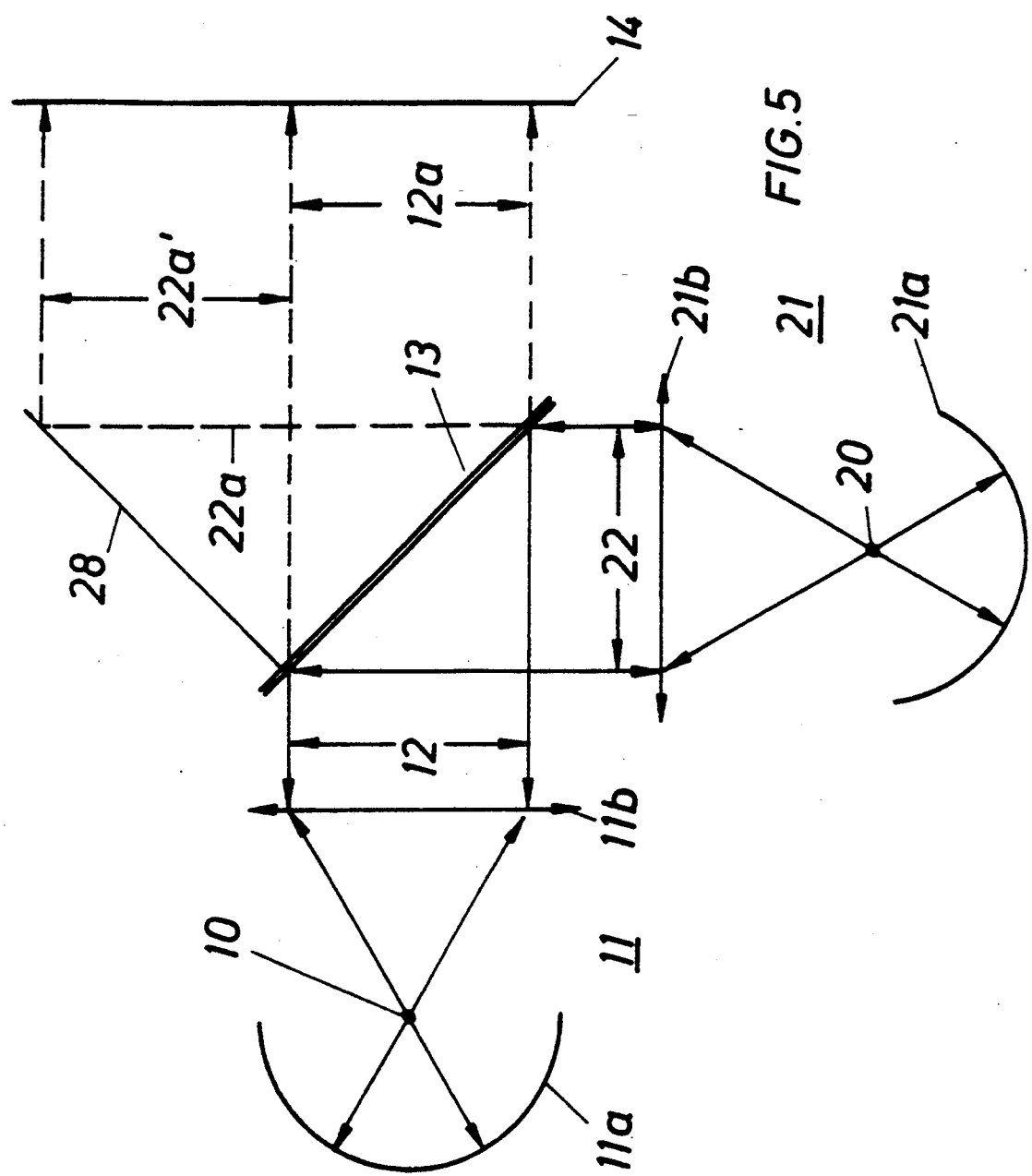

ILLUMINATION DEVICE HAVING BEAM SPLITTING POLARIZATION MEANS

CROSS-REFERENCES TO RELATED APPLICATIONS

This is a continuation of PCT application PCT/EP 91/01329 filed Jul. 16, 1991 by Christopher Robillard and titled "Polarized Light Lighting Device".

BACKGROUND OF THE INVENTION

This invention is directed to a device for providing polarized light. It is well known that linearly polarized light is required for certain applications. An electric light bulb, which normally emits nonpolarized light, can be used to generate linearly polarized light by using a means of polarization, such as a polarizer or a polarization beam splitter (PBS), a light component can be polarized in any desired direction. Polarized light is used in many fields, such as investigating glass elements for mechanical stresses. Polarized light can also be used to illuminate liquid crystal displays (LCDs), which can also be employed as part of a projection system. Although the present invention is described in the environment of an LCD projection system, it is to be understood that the inventive illumination system is not limited to such applications.

Radiation with polarized light and high luminous power is necessary for projection systems which include liquid crystal modulators, also called light valves, or cells. In order to present color pictures, projection systems split the luminous radiation emitted from a light source using color filters, such as dichromatic mirrors, into three spectral colors red, green and blue light, and modulate the radiation by means of suitable light modulators. The radiation modulated in this way is projected through a system of lenses onto a reflecting or transmitting medium, such as a picture screen, such that the red, green and blue light components are well-adjusted with respect to each other.

A backprojection television is known from SID 89 Digest, pp. 114 through 117, according to an article by J. Kobayashi et al., which uses high-resolution a-Si TFT LCD panels as light modulators. A suitable optical system consisting of several mirrors and projection lenses is also described in this article. In the European document for public inspection EP 258 927 A2 a display system is introduced which is suitable for projection in television and video systems. This system contains individual picture elements (pixels) which are used to modulate light by applying voltages, or currents, to appropriate connections. When light is radiated onto the pixels from one side and the pixels are mapped onto a front projection, or back projection, screen by projection lenses, a visible picture is made by triggering of the individual pixels. The aforementioned document for public inspection also specifies how the efficiency can be improved when using polarized light which is obtained from a lamp through a so-called polarization beam splitter. A light source for polarized light is described in SID 90 Digest, pp. 324 through 326, according to an article by M. Schadt et al., which uses a so-called cholesteric liquid crystal filter. In EP 258 927 A2 a system of illumination is introduced which uses two lamps placed next to each other is described.

The illumination systems known from the state of the art result in high losses, depending on the side (aspect) ratios, because of the geometry of the light beam emitted, which is normally of circular symmetry, and the geometry of the rectangular panel to be illuminated, which normally has an aspect ratio of 4:3 or 16:9.

If polarized light is to be used for the illumination of the light valves, then the means of polarization, for example, polarization beam splitters, can be advantageously designed in such a way that they cause the splitting and deflection of two partial beams. With an arrangement of the invention in which at least two lamps are used has the advantages that with equal illumination of the light valves the individual lamps are less heavily loaded, and if one lamp fails the function of the illumination system is maintained by the other lamp. The use of lamps with lower rated power also has the advantage that the rays are better focussed. This leads to a smaller illuminated area and hence reduced losses.

Moreover, the means which focuses the light from a lamp, can be designed in such a way that it serves as a means of deflection for a partial beam from at last one further lamp. Additional means thus are not needed and the luminous power is increased. The luminous power of the facility according to the invention can be increased even further by using additional means of focusing, such as lens systems. Means which prevent overheating of the system can extend the working life of the system and raise its long-term efficiency. The simultaneous illumination of light valves enables reproduction of color pictures. The illumination system known from the state of the art does not have the reliability required for continuous operation.

SUMMARY OF THE INVENTION

It is an object of the invention to provide an illumination using polarized light and which has increased reliability. With the invention, the light from a light source, such as a metal halide lamp, is focussed with the aid of focussing means and split by, polarization means, into effective radiation having a first polarizing direction and complementary radiation having a second polarizing direction. In this context, polarizing direction is defined as both the direction of field vectors of linearly polarized light and also as the direction of rotation of circularly (elliptically) polarized light.

With the invention, the effective radiation is directed onto the media to be illuminated and the complementary radiation is deflected such that by reflection and transmission processes the polarization direction is changed. The new polarizing direction of the complementary radiation is at least partly the same as that of the polarizing direction of the effective radiation. In this context, a change in the polarizing direction is understood to mean that with linearly polarized effective radiation, the new polarizing direction of the complementary radiation has components which run in the same direction as theft of the effective radiation. This will normally be achieved through depolarization. In accordance with a first embodiment of the invention the change in the polarizing direction of the complementary radiation is achieved by reflection from a rough surface or by passing through a rough surface. In this context, rough surface is understood to mean a surface which exhibits unevenness, the order of magnitude of which is greater than the wavelength of the light used. Owing to the fact that the polarizing direction is turned at a rough surface, means which convert linearly polarized radiation into circularly polarized radiation, such as small quarter-wave plates which are normally heavily dependent on the wavelength, can be omitted in this solution. Reducing the number of means which need to be precisely adjusted thus allows the reliability of illumination facilities of the aforementioned type to be improved.

In another embodiment the reliability of the illumination system is improved by the provision of a second light source having its own focussing means. This focussing means is also used to deflect the complementary radiation from the first light source. Also, the complementary radiation from the second light source is deflected by the focussing means of the first light source.

When using two light sources each having a focussing means, the use of means which convert linearly polarized radiation into circularly polarized radiation can be provided. As circularly polarized radiation changes its polarizing direction of rotation through reflection, subsequently passing the radiation through means which convert the circularly polarized radiation into linearly polarized radiation can also change the linear direction of polarization. The changing of linearly polarized radiation into circularly polarized radiation, as well as the converse, can be performed by a small quarter-wave plate. With suitable beam control, both conversions can be effected by a single small quarter-wave plate. The use of two light sources is also advantageous in that a specified prescribed luminous intensity can be realized while the light sources are operated using less power than would be necessary if only one light source were to be used. Another advantage of the use of two light sources, and wherein the means of focussing for each lamp also serves as the means of deflection for the radiation from the other lamp is that the light source heats up more than it would by its own power dissipation alone. Therefore, it is possible to operate the light sources at a decreased power level and not fall below the operating temperature of the lamps.

The uniformity of the radiation can be increased by using light sources having a roughened or frosted surface. Such a toughened surface is used to depolarize the complementary radiation.

Conventional light sources, such as the aforementioned metal halide lamps, are especially heavily stressed if the lamp is switched on again after having only been switched off briefly. If two light sources are used, then there also exists the possibility that these are triggered alternately. This solution has the particular advantage that the period for which an individual light source is switched off can be lengthened and hence the working life of the lamp is enhanced. Another advantage is that a metal halide lamp which has cooled down requires a lower ignition voltage when switching on than a "hot" lamp. Normally, with a cool lamp less than 10 kV is necessary, and with a "hot" lamp more than 20 kV. Therefore, if the normal operating switch-on temperature is reduced, a power supply with less power may be used, and the production and operating costs are reduced. When using two light sources, the effective radiation of which exhibits different planes of polarization either one of the light sources can effect a normal or an inverse image on an LCD when the source is turned on.

When mirrors which are transparent to light components having a predetermined range of wavelengths and reflect light components of other ranges of complementary wavelengths (dichroic mirror), are used as the polarization means the advantage of reducing heating-up of the system is realized.

If mirror elements of the above type are arranged with small lateral dimensions for different ranges of effective wavelengths in the beam path of an effective beam, then the desired ranges of effective wavelengths (red, green blue) can be obtained without any special means of deflection.

BRIEF DESCRIPTION OF THE DRAWINGS

Further features, advantages and details of the invention are explained with reference to the drawings, in which:

FIG. 5 is a third preferred embodiment with two light sources and widened effective beam;

DESCRIPTION OF THE PREFERRED EMBODIMENTS

Figure 1:
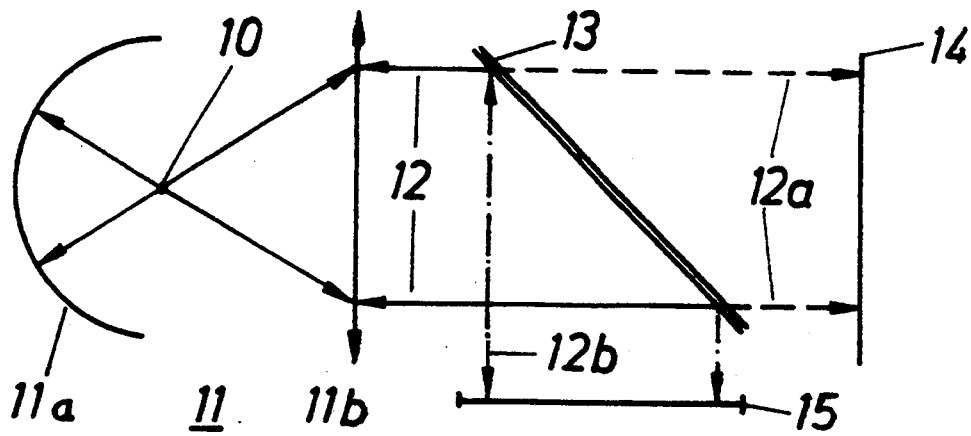
FIG. 1 is a first preferred embodiment with a single light source.

In the following, elements, signal paths and beam paths which have the same meaning have been provided with the same reference characters in the FIGURES and after they have been described once they will only be further mentioned in the further description insofar as is necessary for the understanding of the present invention.

FIG. 1 shows a first embodiment with a single light source 10. The light emitted by source 10 is focussed to a parallel light beam by a means of focussing means 11, in this embodiment a spherical concave mirror 11a, the focal point of which coincides with the position of the light source 10, and a lens 11b, the focal point of which also coincides with the position of the light source 10. The parallel beam passes onto a means of polarization 13, which in this embodiment is a polarization beam splitter. The beam splitter 13 divides the light beam 12 into an effective beam 12a and a complimentary beam 12b. Effective beam 12a has a first polarizing direction and passes to an element 14 which is to be illuminated, such as an LCD display. The complementary beam 12b has a second polarizing direction and is reflected onto a mirror 15. The complementary beam 12b is reflected back to the polarization beam splitter 13 by the mirror 15 and subsequently to the lens 11b. The lens 11b focuses the deflected complementary beam 12b onto the light source 10, which in this embodiment example has a glass body with a rough surface. The deflected complementary beam 12b is depolarized by passing through the rough surface, thereby exhibiting components of the first polarization direction. The light beam then passes to the concave mirror 11a and subsequently to the lens 11b, and leaves the focussing means 11 as a parallel light beam and as part of the light beam 12. Components of the first polarization direction are present and the polarization beam splitter 13 again splits the beam into an effective beam 12a and a complementary beam 12b, both having the same polarization directions that they previously had.

If one imagines that the light source 10 has emitted luminous radiation for only this short period of time, it can be seen that the radiation is either directed by the polarization beam splitter 13 directly to the LCD 14 as an effective beam 12a or deflected by the mirror 15, the polarization beam splitter 13, the lens 11b, the rough surface of the light source 10 and the concave mirror 11a as a complementary beam 12b until almost all the light generated by the light source passes as an effective light beam 12a to the LCD 14. It should be noted that with the concept outlined above, absorption processes have not been taken into account. During actual operation of the light source 10, the beam 12 and the deflected complementary beam 12b overlap each other without interfering. Significant with this embodiment is that components of the first polarization direction are caused by transmitting and reflecting processes at the rough surface of the light source 10.

Figure 2:
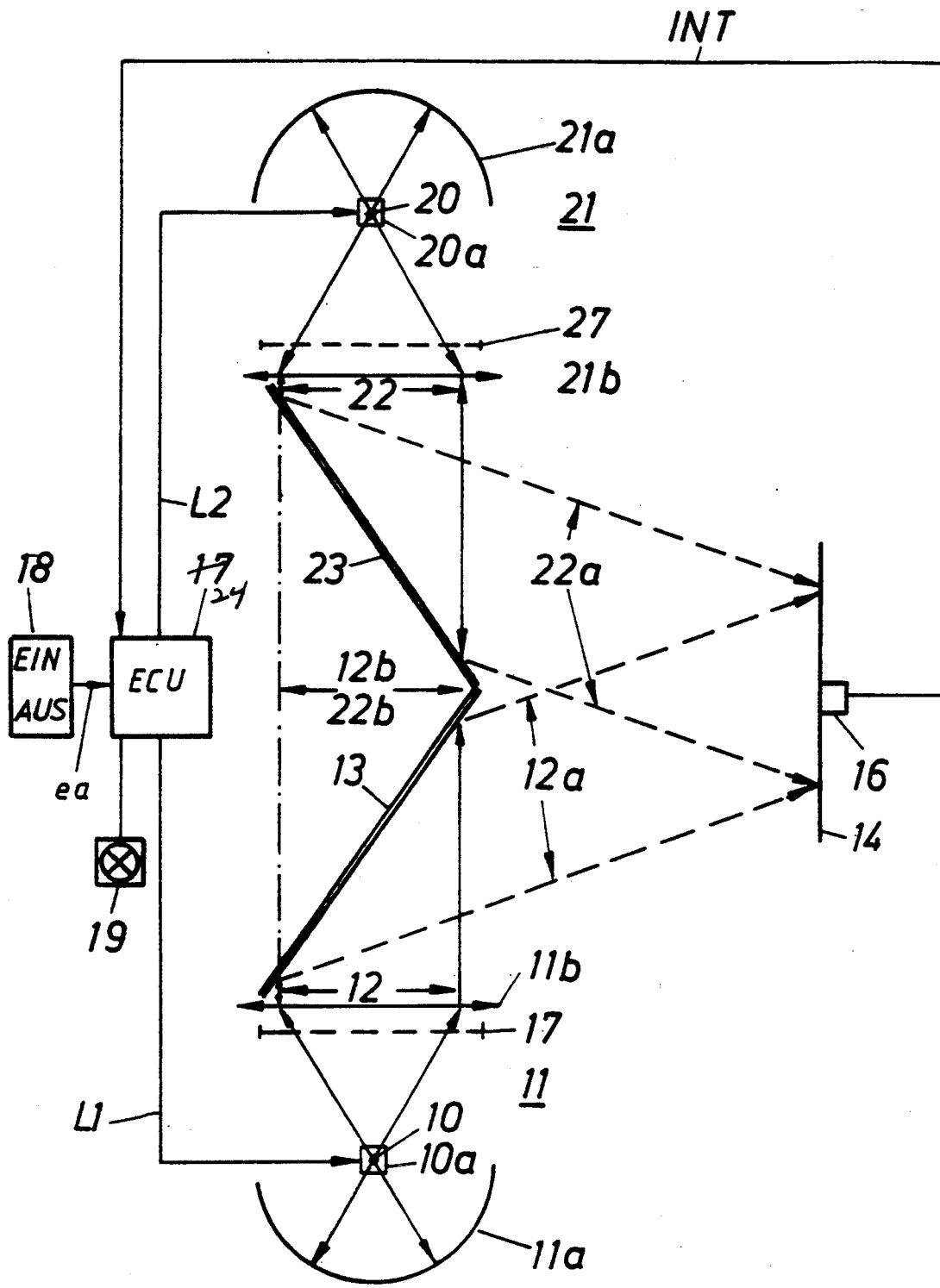
FIG. 2 is a second preferred embodiment having two electronically triggered light sources with their own means of focussing.

FIG. 2 is an embodiment including a first light source 10 and a second light source 20. The light from the first light source 10 is focussed by the first means of focussing 11. The light from the second light source 20 is focussed by the second means of focussing 21 which consists of a second concave mirror 21a and a second lens 21b. The first light beam 12 is divided into the first effective beam 12a, with a first polarization direction, and into the first complementary beam 12b, with a second polarization direction. The second light beam 22 is divided by a second polarization beam splitter 23 into a second effective beam 22a and into a second complementary beam 12b. The two effective beams 12a and 22a pass on to the LCD 14.

In a second version of this embodiment, a first small quarter-wave plate 17 is provided between the first light source 10 and the first polarization beam splitter 13. A second small quarter-wave plate 27 is arranged between the second light source 20 and the second polarization beam splitter 23. The beam splitters 17 and 27 are indicated by dotted lines in FIG. 2. A light sensor 16 is provided to detect the intensity of the beams 12a and 22a. The sensor 16 sends signals INT, which are a measure for the light intensity at the input of the sensor 16, to an electronic control unit (ECU) 24. The electronic control unit 24 is also connected to an input/output unit 18, from which it receives signals 'ea'. Depending on the signals INT or 'ea' respectively, using a signal L1, the electronic control unit 24 triggers a first means of supply 10a, which supplies the first light source 10 the necessary electrical energy. Using a signal L2, the electronic control unit 17 triggers the second means of supply 20a, which supplies the second light source 20 with the desired electrical energy. In the simplest case, the means of supply 10a and 20a can be lamp sockets for the light sources 10 and 20. The signals L1 and L2 correspond in this case to the supply voltages for the light sources used. It is also conceivable that the means of supply 10a and 20a are connected to electrical supply devices, not illustrated here, and the light sources supplied with the desired amount of energy depending on values of the triggering signals L1 and L2. The values of the triggering signals L1 and L2 can be adjusted by analog and/or digital modulation. Normal operating states as well as alarm conditions can be signaled via a display unit 19 which can be designed as a simple lamp or as an alphanumeric display. It is also conceivable that the display unit be integrated as a part of the LCD 14.

The path of the light emitted from the first light source 10a will be explained first. The light is focussed by the first focussing means 11 into the first light beam 12 which is divided up by the first polarization beam splitter 13 into the first effective beam 12a and the complementary beam 12b. The complementary beam 12b passes unchanged through the second polarization beam splitter 23 and arrives at the second lens 21b which deflects it towards the second light source 20. There, the polarization direction of the first complementary beam 12b is altered by reflection from the rough surface of the light source in such a way that after deflection, by the second concave mirror 21a and the second lens 21b, the beam 12b passes on to the second polarization beam splitter 23 as a part of the second light beam 22 and is divided up by the polarization beam splitter 23 in such a way that a first part goes on as an effective beam to the LCD 14 and a second part goes on as a complementary beam similar to the second complementary beam 22b.

If one again imagines that the first light source was only switched on for a short length of time, then the light emitted either passes as effective beam 12a directly to LCD 14 or, it is reflected back and forth between the first and second means of focussing 11 and 21 until only light of the desired polarization direction remains. The absorption processes have been neglected in this explanation. A similar situation is true for the luminous radiation emitted from the second light source 20.

In a second version of the FIG. 2 embodiment, the first small quarter-wave plate 17 and/or the second small quarter-wave plate 27 are utilized. In this embodiment the rough glass cylinder for either the first or the second light source 10 or 20, respectively, can be omitted, and beam paths ensue as described in more detail in the following. Again starting from the first light source 10, the light emitted is deflected by the first concave mirror 11a passes through the first small quarter-wave plate 17 which passes the light unhindered. The linear polarization of the first complementary beam 12b changes into circular polarization with a first direction of spin after passing through the second small quarter-wave plate 27. This polarization reverses by means of reflection at the second concave mirror 21a so that the deflected complementary beam 21b has circular polarization in a second turning direction. This polarization is converted into linear polarization after the light again passing through the second small quarter-wave pate 27, whereby the polarizing direction corresponds to that of the second effective beam 22a. Thereby, this deflected first complementary beam 12b is converted after passing through the second small quarter-wave plate 27 twice and after an odd number of reflections in such a way that it is directed almost in its entirety to the LCD 14. Similar considerations also apply to the luminous radiation emitted from the second light source 20.

Figure 3:
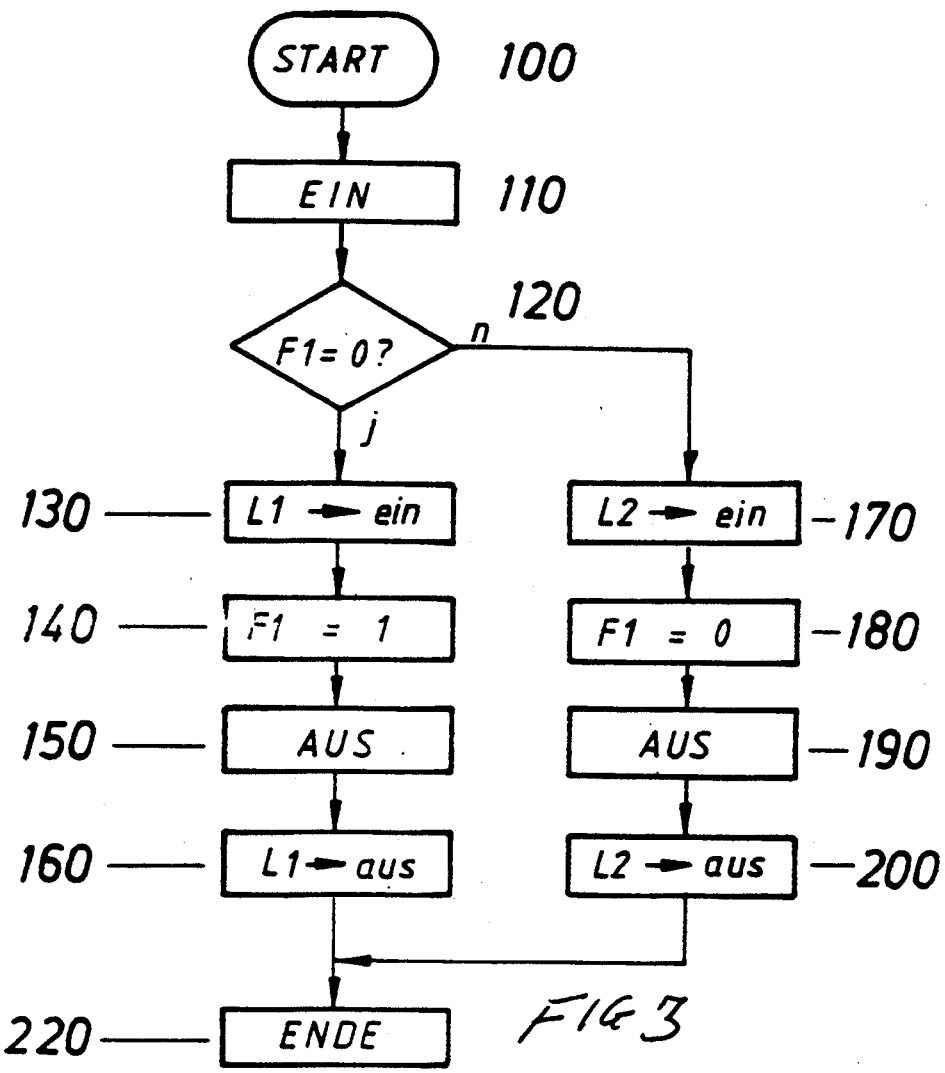
FIG. 3 is a flow diagram of a method for alternate triggering of two light sources.

The means of control already mentioned is also used for further developments of the second embodiment example. The electronic control unit 24 is capable of controlling several operating sequences. A first example is given by the flow diagram in FIG. 3. After the start at step 100, a switch-on pulse 'ea' is sent to the electronic control unit 24 via the input/output unit 18 (step 110). Thereupon, this checks whether the value for a flag F1, stored in a memory which is not illustrated, is equal to "0" (step 120). If the answer is affirmative, then the procedure continues with step 130 which sends a triggering signal L1 to the first means of supply 10a, whereby the first light source 10 is supplied with electrical energy. In step 140 the flag F1 is set to "1". With an "Off" command in step 150, the first lamp is triggered by an appropriate signal L1 in such a way that it is switched off in step 160.

If it is found in step 120 that the flag F1 is not equal to "0", then the procedure continues with step 170 in that a signal L2 is fed to the second means of supply 20a so that the second light source 20 is supplied with electrical energy and switched on. Afterwards, the flag F1 is set to "0" in step 180. With a "Switch off" command in step 190, an appropriate signal L2 is sent out so that the second light source 20 is switched off (step 220). The procedure ends at the following step 210 which also follows step 160.

Figure 4:
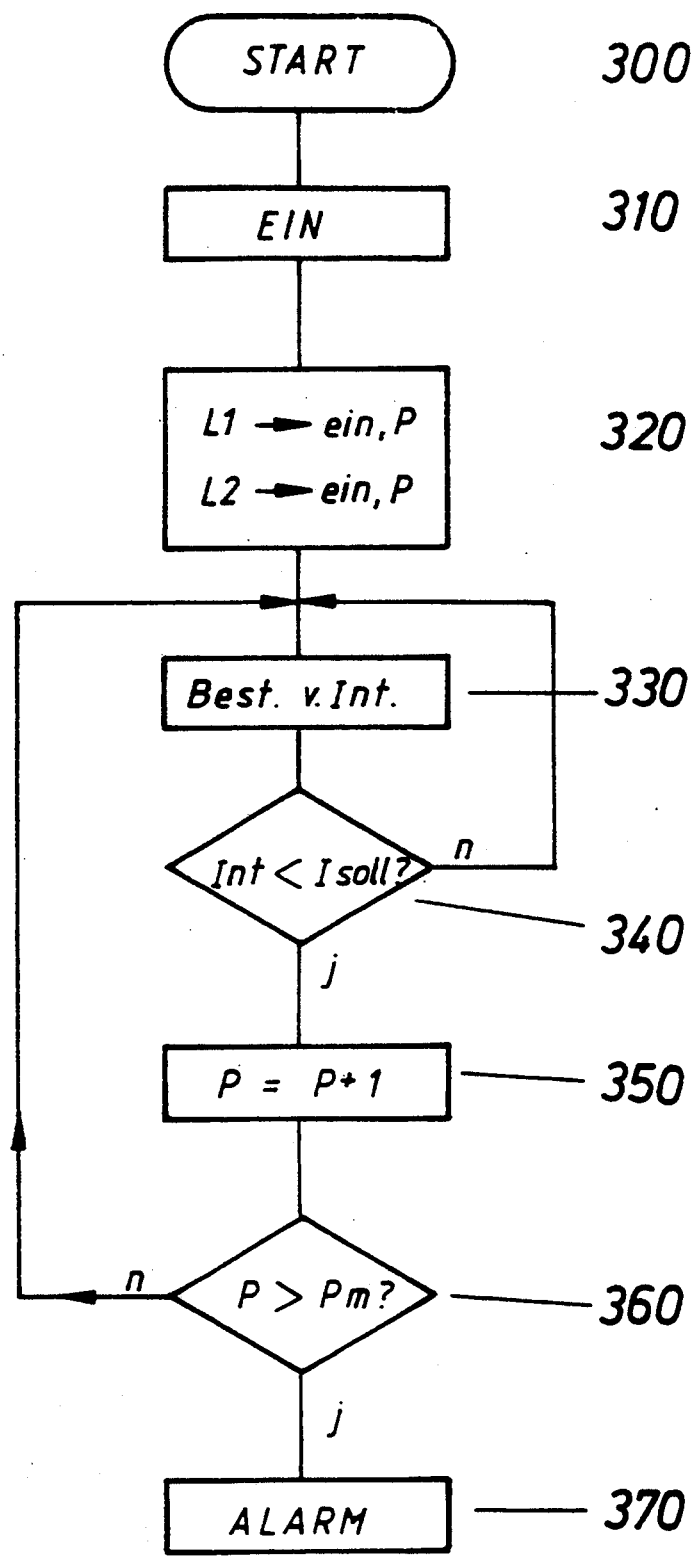
FIG. 4 is a flow diagram of a method for monitoring the operativeness of light sources.

A second exemplary operating sequence, which can be realized by the electronic control unit 24 and the means connected to this, is illustrated by the flow diagram in FIG. 4. After the start in step 300, a switch-on command is given via the input/output unit 18 in step 310. Thereupon, not only the first light source 10 but also the second light source 20 is triggered by means of an appropriate signal L1 and L2, respectively. The value of these signals L1, L2 corresponds to a predetermined value for the electrical power which is to be sent by the supply units 10a, 20a to the light sources 10 and 20, respectively (step 320). The total luminous intensity of the two effective light beams 12a, 22a is measured (step 330) by the light sensor 16 which can also be integrated as part of the LCD 14. The value of the signal INT emitted by said sensor is compared with a desired value for the intensity Isoll in step 340. If the value of the measured intensity is greater than or equal to the desired value, then the procedure returns to step 330.

If, on the other hand, it is established in step 340 that the value of the measured luminous intensity is less than the desired value for the intensity Isoll, then the procedure continues with step 350 in that the value of the triggering signal for the electrical power is raised. If the value determined in step 350 has not yet reached a maximum value Pm, then the procedure jumps from step 360 back to step 330 in order that the steps 330 through 360 may be run through once again. If, on the other hand, it is established in step 360 that the value of the power trigger signal P is already greater than the maximum value Pm, then an alarm status is signaled via the display unit 19 (step 370). With versions of the procedure illustrated in FIG. 4, an analysis may be carried out, for example, by systematic disconnection of the first or second light source 10 or 20 in order to establish in which of the two ranges of the light sources 10 or 20 a fault condition is present. It is also conceivable that instead of one sensor 116, two sensors, not illustrated in the FIGURES here, could be provided which would individually check the luminous radiation of the first and second light sources, respectively.

A third embodiment of the invention is shown in FIG. 5. Specified here are merely the paths of the light beams which are emitted by the first and second light sources and converted by the means drawn. The sequence of electrical triggering and the corresponding monitoring procedure can run in a similar way to that described in the FIG. 2 embodiment. The essential difference with the FIG. 5 embodiment is that the first light source 10 and the second light source 20 are provided with corresponding focussing means 11 and 21 respectively. The light beams emitted by the light sources 10 and 20 are divided into a first effective beam 12a and a second effective light beam 22a using one polarization beam splitter 13. Because the two light beams 12 and 22 are perpendicular to each other, another deflection mirror 28 is provided which converts the second effective beam 22a into a deflected effective beam 22a'. In this embodiment beam 22a is substantially parallel to the first effective beam 12a so that, in total, a larger area can be illuminated on the LCD 14. However, it is also possible for the deflection mirror 28 to redirect the second effective beam 22a' in such a way that the light beams 12a and 22a' to coincide to illuminate a common area.

Figure 6A:
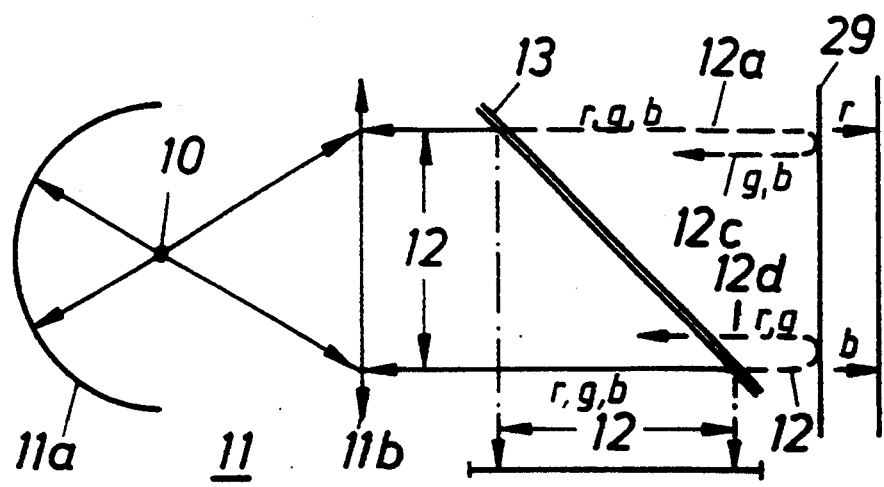
FIGS. 6a and 6b are a fourth preferred embodiment with dichroic mirror elements.
Figure 6B:
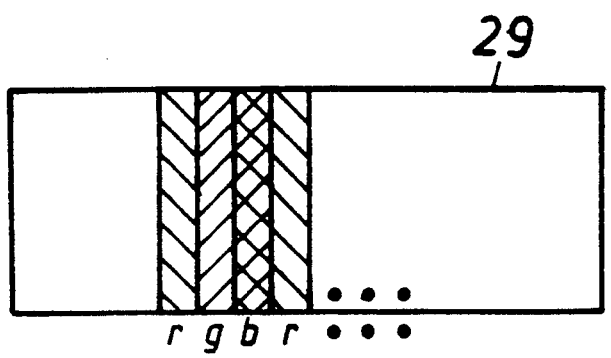

Another embodiment is shown in FIGS. 6a and 6b. This embodiment utilizes a mirror having dichroic reflecting elements, as shown in FIG. 6b. Mirror 29 is arranged in the beam path of the effective beam 12a. The principal behind such reflecting elements is that radiation with a certain wavelength passes through and the rest of the radiation is reflected. However, if one arranges such reflecting elements, as shown in FIG. 6b, for various wavelengths (red, green, blue) next to each other in a strip and the dimensions of the strips are sufficently small, a color image can be produced. FIG. 6a is a symbolic representation of how the effective beam 12a strikes the dichroic mirror 29. From the upper range of the effective beam, only the wavelength range for red light is passed through and the wavelength ranges for green and blue light are reflected to make up light beam 12c. In the lower range of the effective beam 12a, the wavelength range for blue light is passed through and the light components for red and green light are reflected to make up light beam 12d. The reflecting elements of the various wavelength ranges can also run in horizontal strips or any other form of strip. Such arrangements for producing color images are known and no further mention shall be made of these here.

Figure 7:
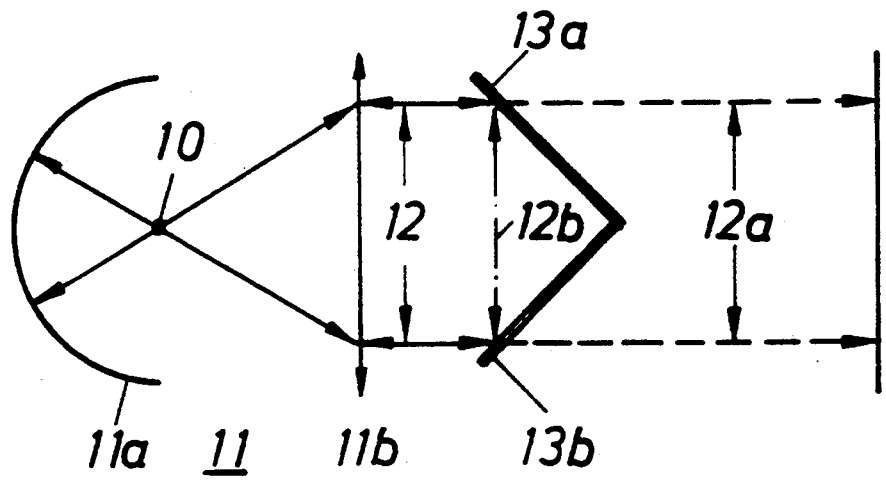
FIG. 7 is a fifth preferred embodiment with offset polarization beam splitters.

A fifth embodiment with offset polarization beam splitters 13a and 13b is shown in FIG. 7. In this embodiment the upper part of the parallel light beam 12 is divided by the upper part 13a of the polarization beam splitter into the effective beam 12a and the complementary beam 12b. Complementary beam 12b is reflected onto the lower part 13b of the polarization beam splitter and then is reflected back to the focussing means 11 and receives components of the first polarization direction after passing through the rough surface of the light source 10. The deflected complementary beam is reflected back by the concave mirror 11a and travles the same path as the original beam 12. The lower part of beam 12 is divided up by the lower part 13b of the polarization beam splitter into the effective beam 12a and the complementary beam 12b which in this case is directed to the upper part 13a of the polarization beam splitter and subsequently to the means of focussing 11. The offset arrangement of the polarization beam splitter means that an additional deflection mirror can be omitted and the amount of glass required can be reduced by half. With the embodiment examples according to FIGS. 5 through 7, the use of small quarter-wave plates is also conceivable.

In order to reduce losses in light when illuminating noncircular areas such as LCD light valves which are normally rectangular in shape with an aspect ratio of 4:3 or 16:9 respectively, at least one of the following variations of the above embodiment is advantageous. Mirrors can be provided in the path of beams 12 and/or 12a which form a frame through which light of the desired geometric dimensions can be passed. The beam components striking the mirrors are reflected in the direction of the respective means of focussing. The mirrors forming the frame can be designed as planar, spherical, elliptical or similar, depending on the type of focussing means used. Parts of the focussing means 11 and 21 may be designed in such a way that the light beams generated have a noncircular cross-section. Two or more of the beams produced can be directed onto the area to be illuminated in such a way that the illuminated area corresponds, at least approximately, to the desired geometry.

Versions of the above embodiments may exhibit at least one of the following variations. Instead of the specified means of focussing, other means known to the expert in the art may be used. It is conceivable, for example, to use elliptically shaped concave mirrors. A light source can be arranged at one of their focal points and the other focal point coincides with the focal point of a downstream lens. Thereby, parallel beams 12 or 22 can also be produced. However, it remains to be considered that for one rotation of planes of polarization with the help of reflections at planar surfaces, circularly polarized light must undergo an odd number of such reflections. Instead of polarization beams splitters (PBSs), cholesteric liquid crystal (CLC) filters can be used. When means having elliptically (circularly) polarized light are to be illuminated, then additional corresponding means, such as small quarter-wave plates in the beam path of the effective beams, can be provided. The rough surface by means of which components of the first polarization direction are generated, can be provided, instead, by the body of the lamp arranged at other means of deflection. In this context polarization means is understood to be that which reflects or refracts light or in some other way gives it a diffuse path. More than two light sources can be provided. These can be triggered by control means in such a way that the load on the individual light sources is reduced. The angle between incident beams and means of polarization can be determined in such a way that the degree of reflection, or degree of polarization, of the beam splitters is optimized taking into account the Brewster angle. More than two partial beams can be formed and each light valve may be illuminated using at least three partial beams. Cold mirrors can be used which deflect visible wavelengths differently to infrared radiation and hence prevent overheating of the system.

Consequently, according to the invention, a facility for illumination using linearly or elliptically polarized light is proposed which allows the reliability to be improved in comparison to known systems. This is achieved, on the one hand, by dispensing with costly, heavily wavelength-dependent means for converting linearly polarized light into circularly polarized light which are considered sensitive and susceptible to interference. Instead, deflection is provided by reflection and refraction at a rough surface which is not susceptible to interference. Such a surface is available with some lamps which serve as light sources, meaning that means can even be saved. By using two light sources with their own means of focussing, if one of the illumination paths fails, operation of the facility utilizing the invention is still guaranteed. In addition, in a further development, supplementary means of control can be employed which indicate operating conditions such as total operating time of individual light sources, etc., as well as fault conditions as required.

If illumination is carried out with noncircular beams which, for example, can be produced by suitable focussing systems of by parallel paths of beams which are actually circular, then, in particular, light valves with rectangular forms (4:3, 16:9) can be illuminated with low losses. Further variations such as the use of dichroic reflecting elements and offset means of polarization, lead to further savings in means of deflection. Therefore, an illumination facility is presented which, for example, can be assigned to a projection system which contains at least one light valve. The illumination facility according to the invention is characterized in that, from the light of at least one lamp, several partial beams are formed, one, two or more of which can be fed to a light valve. The light emitted from the illumination facility may be polarized or nonpolarized. This results in, firstly, the advantage of lower light losses and a more even illumination of the light valves. If at least two lamps are used, the light beams of which are converted such that both partial beams contain light components from each lamp, then there is also the advantage that when one lamp fails, the function of the illumination system is still guaranteed.

I claim:

1. A device for illuminating a rough surface area comprising:

means for focussing a light ray from a first light source into a beam;

polarization means for splitting said beam into an effective beam having a first polarization direction and a complimentary beam having a second polarization direction, said polarization means reflecting said effective beam toward said rough surface and transmitting said complementary beam;

said rough surface having a roughness at least an order of magnitude greater than the wavelength of said light for diffusing and reflecting at least a portion of said complementary beam back to said means for focussing and for reflecting another portion to said area.

2. The device of claim 1 further including:

second means for focussing light from a second light source into a second beam;

second polarization means for splitting said second beam into a second effective beam having said first polarization direction and a second complimentary beam having said second polarization direction, said second polarization means reflecting said effective beam toward said area and transmitting said second complementary radiation to said first light source;

a second rough surface having a roughness at least an order of magnitude greater than the wavelength of said light for diffusing and reflecting at least a portion of said first complementary beam to said first means for focussing; and wherein said first and second rough surfaces are the surfaces of said first and second light sources.

3. The device of claim 2 further including means for alternately turning said first and second light sources on and off.

4. The device of claim 1 wherein said polarization means includes reflecting elements which are individually transparent to one of the primary colors of light and reflect light having wavelengths different from the primary light colors.

5. The device of claim 1 further including a sensor for sensing the intensity of light at said area; and control means responsive to said sensor for providing an alarm when said light intensity falls below a preselected level.

6. The device of claim 2 further including a sensor for sensing the intensity of light at said area; and control means responsive to said sensor for providing an alarm when said light intensity falls below a preselected level.

7. The device of claim 2 further including means for reflecting said complementary beam to said area as a beam parallel to said effective beam to illuminate a large area.

* * * * *